United States Patent [19]
Oram et al.

[11] Patent Number: 5,944,196
[45] Date of Patent: Aug. 31, 1999

[54] MERCURY RECOVERY PROCESS

[75] Inventors: Peter Glen Oram, Halifax; John Daniel Currie, Pictou; Richard Masaichi Kenno, Concord; Nabil Elias Battikha, Markham, all of Canada

[73] Assignee: Pioneer Licensing, Inc., Wilmington, Del.

[21] Appl. No.: 08/875,304

[22] PCT Filed: Jan. 24, 1996

[86] PCT No.: PCT/CA96/00054

§ 371 Date: Oct. 15, 1997

§ 102(e) Date: Oct. 15, 1997

[87] PCT Pub. No.: WO96/22834

PCT Pub. Date: Aug. 1, 1996

[30] Foreign Application Priority Data

Jan. 27, 1995 [GB] United Kingdom .................... 9501604
May 31, 1995 [CA] Canada .................................. 2150591
Aug. 2, 1995 [CA] Canada .................................. 2155249

[51] Int. Cl.$^6$ .................... B03B 5/66; C02F 3/00
[52] U.S. Cl. .................... 209/158; 209/159; 210/614
[58] Field of Search .................... 209/154, 158, 209/159, 172, 172.5, 173, 175, 208; 210/94, 95, 614, 709, 739, 746

[56] References Cited

U.S. PATENT DOCUMENTS

| | | |
|---|---|---|
| 1,483,371 | 2/1924 | Miller . |
| 2,552,378 | 5/1951 | McNeill . |
| 3,550,773 | 12/1970 | Villani et al. . |
| 3,642,129 | 2/1972 | McDaniel et al. . |
| 3,700,102 | 10/1972 | Higgins .................................... 209/454 |
| 3,799,341 | 3/1974 | Papworth ............................. 209/172.5 |
| 3,976,197 | 8/1976 | Bhattachayra ........................... 209/11 |
| 4,175,662 | 11/1979 | Zold .................................... 209/552 X |
| 4,332,592 | 6/1982 | Muller .................................. 23/301 X |
| 4,554,066 | 11/1985 | Turbitt et al. . |
| 4,555,933 | 12/1985 | Johnston ................................. 73/28 X |
| 4,789,464 | 12/1988 | Kuryluk . |
| 4,913,807 | 4/1990 | Hendricks . |
| 5,525,240 | 6/1996 | Lemelson ............................ 210/745 X |

FOREIGN PATENT DOCUMENTS

0 420 380   4/1991   European Pat. Off. .

Primary Examiner—David H. Bollinger
Assistant Examiner—Kenneth W. Bower
Attorney, Agent, or Firm—Pillsbury Madison & Sutro, LLP

[57] ABSTRACT

A process and apparatus for the recovery of heavy metals from a heavy metal-contaminated material wherein the heavy metal, or particles containing the heavy metal, are separated from the material by a hydraulic mineral separator. The process and apparatus may be used, for example, in removing or recovering of mercury from a mercury-contaminated soil, caustic sludge, or similar material. The process provides a ready method for removal of mercury from mercury-contaminated materials or, more generally, heavy metals from heavy metal contaminated soils which process can allow recovery of the mercury or heavy metal for re-use. The apparatus allows for continuous operation of the mineral separator and automates various functions of the separator allowing for improved control of the process.

22 Claims, 5 Drawing Sheets

MERCURY RECOVERY PROCESS

FIELD OF THE INVENTION

This invention relates to a process for the recovery of mercury, or other heavy metals from a mercury or heavy metal contaminated material, and an apparatus suitable for use in such applications. In particular, the invention relates to a process for recovery of mercury from a mercury-contaminated soil in order to effect remediation of said soils, or for the recovery of mercury from a mercury-contaminated material such as a caustic sludge.

DESCRIPTION OF THE RELATED ART

Liquid mercury is used in a variety of industrial processes including its use as an electrode in some chlor-alkali plants for the production of gaseous chlorine and an aqueous solution of an alkali metal salt. The use of such mercury cells for this application is well known in the industry, and is commonly used for the electrochemical generation of chlorine and sodium hydroxide from a sodium chloride solution. The use of other alkali metal salts, such as potassium chloride to produce potassium hydroxide, is also known.

Occasionally, during operation of this type of chlor-alkali plant, some mercury may be lost to the environment where it contaminates the soil in the immediate vicinity of the cell. This contaminated soil is generally disposed of by, for example, sending the soil to a suitable landfill operation which is set up to handle this type of waste material. However, since the actual amount of mercury loss to the environment is relatively small, and the amount of soil which must be land-filled is generally large, the cost of such a land-filling operation can amount to a significant expense.

Further, during operation of this type of chlor-alkali plant, finely dispersed mercury droplets are suspended within the generated aqueous solution. These mercury droplets are typically removed from the aqueous solution by filtration through a suitable filtering medium. This medium is most commonly powdered or granular carbon, but can include other organic, polymeric or inorganic filtering medium. After the mercury has been removed from the aqueous solution, a mixture of mercury mixed with the filtering medium is generated. This mixture is termed in the industry as "caustic sludge" since typically, it is generated from an aqueous caustic (sodium hydroxide) solution.

However, in this document, the term "caustic sludge" will be used to refer to any mixture of mercury and a filtering medium wherein this mixture is generated during filtering of an alkali metal salt solution.

Caustic sludge is thus primarily a mixture of carbon and/or some other filtering medium, and mercury. The level of mercury is dependent on the operation of the plant, but may be as high as 70% (or more) mercury, by weight. However, typically, the level of mercury present is between 30% and 55%, by weight, of the content of the caustic sludge sample.

Disposal of this sludge is generally difficult and/or expensive because of its contamination with mercury. Thus, landfilling of the caustic sludge in an appropriate land-fill operation, as one disposal means, can be a significant expense. Further, loss of the mercury adds to the expense of the operation of the chlor-alkali facility.

A second method for disposal of the caustic sludge material is mixing the caustic sludge with a large excess of water while stirring in order to "wash" the mercury droplets from the caustic sludge amalgam. This approach has met with some success, but separation of the mercury from the sludge is not complete, and the method does not consistently provide the levels of mercury removal desired.

Accordingly, it would be desirable to provide an improved method for the removal of mercury from soils or from caustic sludge, and preferably, for the recovery of the mercury contained in the soil or sludge.

In the mining industry, it is known that ore particles containing precious metals, such as gold, can be separated from other particles of comminuted ores, by use of a hydraulic mineral separator. This type of device uses a upward flow of a liquid, which is preferably water, through an essentially vertical tube, to separate those particles having a higher density from those particles with a low density. Generally, the liquid stream enters the vertical tube at or near the bottom of the tube and flows upwardly until it exits the tube at or near the top of the tube. Sample particles of an essentially constant size (by volume) are fed into the top of the tube. The rate of liquid flow is controlled so that only the heavier particles will settle and/or sink through the upwardly flowing liquid stream. The lighter particles are unable to sink through the upwardly flowing liquid stream and remain at, or near the top of the vertical tube.

These types of hydraulic mineral separators have been know for a number of years and have been described by, for example Miller in U.S. Pat. No. 1,483,371 (issued Feb. 12, 1924), McDaniel et al. in U.S. Pat. No. 3,642,129 (issued Feb. 15, 1972), Turbitt et al. in U.S. Pat. No. 4,554,066 (issued Nov. 19, 1985), and Kuryluk in U.S. Pat. No. 4,789,464 (issued Dec. 6, 1988). While these types of devices have been known for several years, their primary use has been limited to the classification of ore samples for mining operations as a guide to the amount of heavy metals present in an ore sample.

An operational modification of the standard technique for use of a mineral separator is the practise of manually causing an intermittent reduction in the flow of water into the apparatus, or causing an intermittent reduction in the flow of liquid at a regular time interval. This reduction causes particles currently in the lower parts of the vertical tube to fall more rapidly out of the bottom of the tube. While this technique provides a method to improve the rapidity of ore classification, it would be desirable to improve this technique further.

However, to date, it has been unknown to use a hydraulic mineral separator for the purpose of recovering mercury from a mercury-contaminated material, or more generally for the recovery of a heavy metal from a heavy metal contaminated material. Further, the use of a hydraulic mineral separator for recovering mercury or other heavy metals (or concentrating into a smaller soil sample) from heavy metal-contaminated soils, or from a caustic sludge, is also unknown.

SUMMARY OF THE INVENTION

Accordingly, the present invention provides a recovery process for recovery of a heavy metal from a heavy metal contaminated material comprising i) classification of said heavy metal contaminated material to form a material sample having material particles of substantially the same particle size, ii) treatment of said material particles in a hydraulic mineral separator to form a higher density, heavy metal-containing fraction and a lower density, substantially heavy metal-free fraction, and iii) separation of said higher density fraction from said lower density fraction.

The heavy metal of most interest in the practise of the present invention is mercury, and the remaining discussion will be directed at a process for recovery of mercury. However, any other heavy metal, such as lead, might also be recovered or removed from a contaminated soil sample through the process of the present invention.

Accordingly, the present invention also provides a process for recovery of mercury from a mercury-contaminated materials comprising i) treatment of said mercury-contaminated material in a hydraulic mineral separator to form a higher density, mercury-containing fraction and a lower density, substantially mercury-free fraction, and ii) separation of said higher density fraction from said lower density fraction.

The mercury-contaminated material may be, for example, a caustic sludge as defined hereinabove, or may be another mercury-contaminated material such as a catalyst, or the like. Further, the mercury is preferably present as liquid mercury, but may be present in the contaminated material as a mercury compound.

When employed to treat a caustic sludge sample, the present invention also provides a caustic sludge treatment process for removal or recovery of mercury from said sludge, which process comprises i) treatment of said sludge in a hydraulic mineral separator to form a higher density, mercury-containing fraction and a lower density, substantially mercury-free fraction, and iii) separation of said higher density fraction from said lower density fraction.

In operation of the hydraulic mineral separator, the particles containing the heavy metal, or mercury, or even mercury droplets will settle/sink through the vertical tube of the separator because of the high specific gravity of heavy metal or mercury. These high specific gravity droplets and/or particles can be collected at the bottom of the tube.

The liquid flow rate through the separator is set so that the denser particles will settle through the vertical tube, and that the lighter particles will be washed out of the top of the separator. It is apparent that the flow rate may vary depending on the nature of the sample being treated.

Preferably, the mercury contaminant from a mercury-contaminated material separates completely from the sample so that it forms a relatively heavy, dense mercury droplet. This heavy, dense droplet of mercury will settle through the separator.

Additionally, where the process of the present invention is utilized to remove mercury from a mercury contaminated soil, the process allows the concentration of the mercury into a smaller volume, soil sample. However, preferably, the liquid mercury separates from the soil sample in order to form a relatively heavy, dense mercury droplet, as described above. This heavy, dense droplet of mercury will settle through the separator, and thus, the hydraulic mineral separator will effectively remove the mercury from the soil sample. Accordingly, in a preferred embodiment, the process of the present invention provides a method for the removal of mercury from a mercury-contaminated soil sample.

The remaining soil particles, which do not contain mercury, or from which the mercury has been removed, are not sufficiently heavy to sink through the liquid flow and thus will collect at the top of the tube.

Depending on the efficiency of the hydraulic mineral separator the resultant "high density particles" found in the high density portion, may consist essentially of mercury with some trace amount of soil contamination. This mercury may be collected and reused as liquid mercury after additional purification (if desired). The high density particles may also be collected as a smaller volume soil sample which contains higher levels of mercury than the initial, larger volume soil sample. Treatment and/or disposal of the smaller soil sample is preferable to treatment and/or disposal of the larger volume soil sample since the cost of disposal of this concentrated sample in, for example, an approved land-filling operation, would be reduced over the cost of land-filling the larger initial volumes of contaminated soil.

The remaining soil particles are separated from the mercury (or other heavy metal) contamination and thus, are essentially free from contamination. These soil particles may be returned to the original site as part of a soil remediation program.

Because of the high specific gravity of the liquid mercury, essentially all of the mercury will be removed with the soil of higher density. However, the efficiency of the process in separating mercury from the total soil sample is dependent on the process conditions utilized. It is preferred, however, that the process conditions be set so that the "high density particles" consist of greater than 90% mercury, and that the mercury collected as "high density particles" accounts for greater than 90% of the mercury originally present in the soil sample. More preferably, both of these levels are greater than 95%, and most preferably, both of these levels are greater than 99%.

In the embodiment of the process of the present invention wherein the hydraulic mineral separator is used for treatment of a contaminated soil, the soil sample is classified by particle size. This classification stage can be any of a number of soil treatment processes and can involve process such as crushing and screening, and the like. Generally, the purpose of this process stage is merely to provide particles which have a given particle size by volume. This first classification stage may be merely a screening of the soil in order to form a number of different soil samples wherein the particle size within each sample is essentially constant. Each soil sample can then be sent through the hydraulic mineral separator with the process conditions of the separator being set for each individual soil particle size.

Preferably, the classified soil particle sample will have a soil particle distribution such that greater than 90% of the soil particles will have a particle size which is between 50 and 150% of the median particle size. More preferably, the soil particles in the soil sample such that greater than 95% of the soil particles will have a particle size which is between 75 and 125% of the median particle size. A preferred soil sample size would be in the range of 0.1 to 1 cm, and more preferably, in the range of 0.1 to 0.6 cm, and most preferably between 0.2 and 0.4 cm. However, any suitable soil particle size may be acceptable provided that the process parameters of the hydraulic mineral separator can be adjusted to treat the soil size selected.

When used for treatment of caustic sludge, the mercury droplets are removed from the bottom of the hydraulic mineral separator, as described hereinabove. The remaining caustic sludge material, from which the mercury has been removed, generally consists of the remaining caustic filtering medium. This filtering material is less dense than the mercury, and thus will not be sufficiently heavy to sink through the liquid flow and thus will collect at the top of the tube. The low density filtering material can thus be removed from the top of the mineral separator system.

Thus, the hydraulic mineral separator will effectively remove the mercury from the caustic sludge. Accordingly, in a preferred embodiment, the process described hereinabove with respect to the present invention provides a method for the removal and recovery of substantially pure mercury from a mercury-contaminated caustic sludge sample.

Depending on the efficiency of the hydraulic mineral separator, the resultant material found in the high density portion may consist essentially of mercury with some trace amount of sludge contamination. This mercury may be collected and reused as liquid mercury after additional purification, if desired.

The high density material may also be collected as a smaller volume caustic sludge sample which contains higher levels of mercury than the initial, larger volume caustic sludge sample. Treatment and/or disposal of the smaller sludge sample is preferable to treatment and/or disposal of the larger volume sludge sample since the cost of disposal of this concentrated sample in, for example, an approved land-filling operation, would be reduced over the cost of land-filling the larger initial volumes of contaminated sludge.

As a further purification stage, the sample of high density particles collected from the mineral separator may be sent through one or more additional mineral separators to further reduce the sample size of the mercury-containing, high density fraction. Further, the sample may be sent through a series of mineral separators (or through the same mineral separator a number of times) until the high density fraction is essentially droplets of mercury. Accordingly, in one preferred embodiment, the sludge sample is passed through one or more mineral separators until the high density particles are mercury droplets containing greater than 95%, and more preferably, greater than 99%, mercury by weight.

Thus, the present invention provides a process as described hereinabove wherein said higher density fraction is treated in at least one further hydraulic mineral separator to form a second higher density, mercury-containing fraction and a second lower density, substantially mercury-free fraction, followed by separation of said second higher density fraction from said second lower density fraction.

Most preferably, the present invention provides a process as hereinabove described, comprising a caustic sludge treatment process for removal or recovery of mercury from said sludge, which process comprises i) treatment of said sludge in one or a series of hydraulic mineral separators to form a higher density, mercury-containing fraction and a lower density, substantially mercury-free fraction, and iii) separation of said higher density fraction from said lower density fraction, wherein said higher density, mercury-containing fraction comprises greater than 95%, and more preferably, greater than 99% mercury, by weight, and wherein said lower density, substantially mercury-free fraction comprises less than 1% mercury, and more preferably, less than 0.5% mercury by weight.

The process of the present invention is also applicable to the recovery of mercury from a variety of materials, including, for example, a solid, particulate absorbent or catalyst. Other embodiments can include any materials wherein mercury can be dislodged from the particle by the action of the water flowing through the mineral separator. Concentration of mercury-containing particles can still be accomplished, however, in particles where the mercury is not easily dislodged from the particulate material.

The hydraulic mineral separator can be any of the hydraulic mineral separators known in the mining industry, which can be used to separate materials having a high specific density from those having a low specific density by using a flowing liquid stream. A preferred mineral separator, however, is one which has been designed to operate in a continuous manner so that the contaminated soil can be added continuously to the process, and the mercury and the soil discharge can be removed on a substantially continuous basis. A particularly preferred hydraulic mineral separator is, however, described hereinbelow.

A wide variety of liquids may be used in a hydraulic separator. It is desirable to use liquids which do not react with the materials to be treated in the separator, other than to dissolve the soil particles. The density of the liquid selected should also be such to facilitate the settling of the high density particles through the liquid. A most preferred liquid for use in the present invention is water.

The preferred method of operation of the process of the present invention is an embodiment wherein the mercury is collected as an essentially pure mercury stream. This process allows the collection of a mercury stream which can be recycled and/or re-used. When collected from a soil sample, this method allows for the remediation of contaminated soil so that it can be released to the environment without taking any further treatment stages.

However, the process may be operated in a fashion so that the mercury or a non-liquid heavy metal is concentrated into a smaller soil sample volume. The effect of this type of process is that most of the heavy metal, and preferably, at least 90%, and more preferably, at least 95% of the heavy metal, by weight, which is originally present in the initial soil sample, is concentrated into a relatively small amount of soil. This smaller soil sample is preferably, less than 10%, and more preferably, less than 5% of the original soil sample amount, by volume. This concentrated volume of contaminated soil can then be further treated to remove the heavy metal contamination, or can be sent to a disposal means, such as for example, a landfill operation. However, by reducing the volume of soil to be land-filled, considerable savings in landfill cost can be realized.

However, a preferred method of operation of the process of the present invention is an embodiment wherein the mercury, or heavy metal, is essentially completely removed from the sample treated and is collected as an essentially pure mercury, or heavy metal stream. This particular process allows the collection of a mercury or heavy metal stream which can be recycled and/or re-used, and allows for the disposal of the treated material (e.g. soil, caustic sludge, catalyst and the like) without needing to address the problem of contained mercury or contained heavy metal.

However, in the process of the present invention, it is possible that an unacceptably high amount (depending on various discharge standards) of mercury, or heavy metal, may become dissolved in, or dispersed in (as, for example, fine droplets) the liquid used in the mineral separator. When this occurs, the heavy metal is lost as part of the mineral separator overflow and thus it is necessary to treat the liquid (e.g. water) in order to remove the heavy metal (e.g. mercury) from the water stream.

Accordingly, the present invention also provides a process wherein the liquid being discharged from the mineral separator is treated in a liquid treatment process to remove the heavy metal contaminants, and in the preferred embodiment, to remove mercury from the water used in the mineral separator. Thus, in a preferred water treatment process, the water from the mineral separator which contains the high density particles is directed to a sedimentation tank wherein the high density particles settle from the water, and are removed. This water after settling can be essentially free of mercury and may be discharged or recycled to the process system.

The liquid overflow from the mineral separator (which contains the lower density particles) is also directed to a second sedimentation vessel wherein the solid particles settle to the bottom of the vessel and are removed. Chemicals, such as aluminum sulphate or other conventionally known water treatment coagulants, may optionally be added in order to shorten the sedimentation time, and/or to increase sedimentation efficiency. The supernatant from the sedimentation vessel may be recycled, in whole or in part, to the process, or may be further treated in order to be discharged from the system. A preferred further treatment process involves further sedimentation in additional sedimentation vessels. After the suspended particles have settled and been removed, the final supernatant is treated with acid or caustic as necessary to adjust the pH of the liquid to between 7 and 11, and more preferably between 7.5 and 8.5 and, most preferably to a pH of about 8. The pH adjusted liquid is then treated with various chemicals, such as ferrous sulphate or sodium hydrosulphide to remove any remaining heavy metals (or mercury) as newly created suspended solids or sulphides in a stirred settler. The overflow from the settler can then be filtered through, for example, a sand filter followed by a carbon filter to remove any carbon adsorbent liquids or solids. The carbon filtered water may then be discharged to the environment. In a further aspect, the present invention also provides an apparatus which facilitates the process as described hereinabove, wherein the rate of upward flow of liquid through the vertical tube of the mineral separator is adjusted through the use of a particle sensing means.

Accordingly, the present invention provides a hydraulic mineral separator comprising:

a substantially vertical tube having a liquid inlet at or near the bottom of said tube;

a liquid outlet at or near the top of said tube so that liquid flows upwardly through said tube from said liquid inlet to said liquid outlet;

a particle sensor located within said vertical tube; and, a liquid flow regulator, operatively connected to said particle sensor, which regulator adjusts the flow rate of liquid within said vertical tube when a particle, or particles, is or are, detected by said particle sensor.

The basic components of the hydraulic separator may be any of the known mineral separators described in the prior art. Generally, the vertical tube is of sufficient length to allow the particles to separate in response to the liquid flow selected. The liquid flow rate may be adjusted to effect separation of the higher density particles from the lower density particles for the given sample parameters (size, density and the like) and for the vertical tube length selected.

The separator may be used to separate a wide variety of materials which are capable of being classified by density. This can include the separation of solids of different densities, separation of solids from liquids, and even separating two liquids of different density.

Throughout this document reference is made to high density and low density "particles". In this document, the term "particles" is used to designate solid materials, but can also include droplets of high density liquid, such as for example, droplets of mercury which can be separated from soils, and the like, in the apparatus of the present invention.

The preferred liquid of use in the hydraulic separator is water. However, any other liquid may be used depending on the nature of the materials to be separated. In accordance with standard mineral separator technology, the liquid is added to the mineral separator at the lower portion of the separator so that the liquid will flow upward through the vertical tube. The liquid exits the tube and enters a mixing zone wherein it mixes with the subject sample which is typically added to the mixing zone. After the liquid has mixed with the sample, the higher density particles fall through the vertical tube against the upward flow of the liquid. The remaining lower density particles are eventually removed from the mixing zone of separator together with liquid present in the zone. The liquid may be removed from the lower density particles and preferably is recycled to the mineral separator.

The higher density particles fall through the vertical tube and are removed from the bottom of the mineral separator through an outlet opening. This opening may be open at all times—provided that the flow rate from the outlet is not greater than the flow rate of liquid added to the mineral separator—or may be opened intermittently in order to drain any collected high density particles.

The particle sensor used in the mineral separator of the present invention may be any device which is capable of detecting particles in the liquid stream. Depending on the properties of the particle (which can include a liquid droplet) and the properties of the liquid used in the separator, a wide variety of sensors may be utilized. These sensors may act based on a number of physical property differences including conductivity, capacitance, magnetism and the like. For a non-transparent particle, the sensor is preferably a light sensor which can include sensors operating on any suitable electromagnetic radiation frequency such as infrared or ultraviolet, but most preferably, is one which operates in the visible light spectrum.

The sensor may be located anywhere within the vertical tube so long as it is above the liquid inlet. Preferably, however, the particle sensing means is located in the upper half of the vertical tube so that adjustment of the liquid flow can occur while the sample particle is still within the vertical tube.

The liquid flow regulator may operate by increasing or decreasing the flow rate of liquid to the separator, or by adjusting the flow rate of liquid to the vertical tube by releasing liquid from the separator prior to entering the vertical tube. The flow regulator may operate to turn the liquid flow on and off, or may operate to adjust the flow rate of liquid while maintaining a constant, positive (i.e. non-zero) base flow rate.

The liquid flow regulator is preferably a valve which will open or close in accordance with desired parameters based on signals received from the particle sensor. The particle sensor and the liquid flow regulator are preferably connected through a controller which has been programmed to operate the liquid flow regulator in a pre-determined fashion once a particle has been detected by the particle sensor.

In one preferred embodiment, the particle sensor is located in the upper half of the vertical tube. Once a particle is detected, the liquid flow rate is immediately increased for a set period of time. Preferred time periods range from 0.1 to 10 seconds, and more preferably from 1 to 6 seconds, and most preferably from 1 to 3 seconds. After the set time period, the liquid flow rate is returned to its base flow rate. This base flow rate may be a low flow rate, or may even be a no flow rate (ie the liquid flow is turned off). However, the base flow rate should be low enough so that particles will be able to enter the vertical tube, and, the flow rate during the set time period should be high enough so that only the particles above the desired particle density are able to pass through the vertical tube.

The liquid flow regulator may also function by releasing, or by preventing the release of liquid from the bottom section of the mineral separator. By increasing or decreasing the amount of liquid exiting the mineral separator, the flow rate of liquid flowing upward through the vertical tube is adjusted if the liquid addition rate is kept constant. A combination of control of liquid addition rate and liquid outlet rate may also be used.

The controller is preferably an electronic, and preferably, programmable device adapted to receive inputs from the particle sensor and utilize this information to control the liquid flow regulator.

In another preferred embodiment, the particle sensor is utilized to adjust the flow rate in the vertical tube so as to establish an essentially constant heavy particle collection rate for a given set of operating conditions. In this embodiment, the flow rate is adjusted by the liquid flow regulator so that a steady state condition is achieved wherein a steady amount of higher density particles passes through the tube. If the rate at which particles pass through the tube varies, the liquid flow regulator will adjust the flow rate so as to return the heavy particle collection rate to the pre-established rate. Similarly, the flow rate can be decreased should the heavy particle collection rate fall below the pre-established rate.

In this embodiment, the hydraulic mineral separator will automatically adjust to variations in the composition of the particles added to the separator, and thus will be able to avoid situations wherein all particles are rejected as being too light for entry into the vertical tube, or situations where an excessive number of particles enter the tube.

In a further preferred embodiment, the mineral separator comprises a high density particle level sensor which can detect the level of high density particles which have collected at the bottom of the separator. When the level of high density particles has achieved a certain level, the level sensor will cause an drain outlet to open to remove the high level particles from the separator.

Accordingly, the present invention also provides a fully automated hydraulic mineral separator comprising the hydraulic mineral separator described hereinabove with reference to the present invention and which additionally comprises a high density particle level sensor at the bottom of, or below the bottom end of the vertical tube, and an outlet valve operatively connected to said high density particle level sensor, wherein said outlet valve is opened or closed in accordance with signals received from said high density particle level sensor.

The high density particle level sensor may be any of the level sensors described hereinabove with respect to the particle sensor. Selection of an appropriate high density particle level sensor will be dependent on the nature of the high density particles, but can be, for example, a light sensor.

The outlet valve may be partially open at all times, with increased flow on receiving an appropriate signal from the high density particle level sensor, or may be normally closed and opening only when the high density particle level sensor detects a level of particles which is higher than a set value. The outlet valve may remain open for a set time period, once initiated, or the separator may comprise a second high density particle level sensor wherein the first and second sensor are used to establish a high and low setting for the level of high density particles in the separator.

Through appropriate use of the release of high density particles from the separator the amount of liquid released from the separator (as a "contaminant" with the high density particles) can be minimized.

Other features may additionally be utilized in the apparatus of the present invention. These include: (i) relatively small water inlets near the surface of the particle sensor(s) in order to maintain a clean surface near the face of each sensor; (ii) a water inlet valve near the top end of the vertical tube in order to ensure that this area is not blocked by a large inflow of particles added to the mixer; (iii) a stirring motor in the particle mixer in order to keep particles in the mixer in a free-flowing, non-agglomerated state; (iv) a controller connected to the stirring motor which controller adjusts the rate of particle addition to the mixer based on changes in the power requirement of the mixer, and thus ensures that the number of particles in the mixer is essentially constant, or an stirring motor power indicator which allows an operator to manually adjust the particle addition rate to obtain a constant level of particles in the mixer; and (v) a mixing device within the vertical tube area, such as an ultrasonic mixer, to either prevent agglomeration of some type of particles, such as solid materials, or to assist in agglomeration of other types of particles, such as heavy liquids—for example, mercury.

EXAMPLES

The process and apparatus of the present invention will now be described, by way of example only, by reference to the following examples, and by reference to the attached figures wherein.

Figure 1:
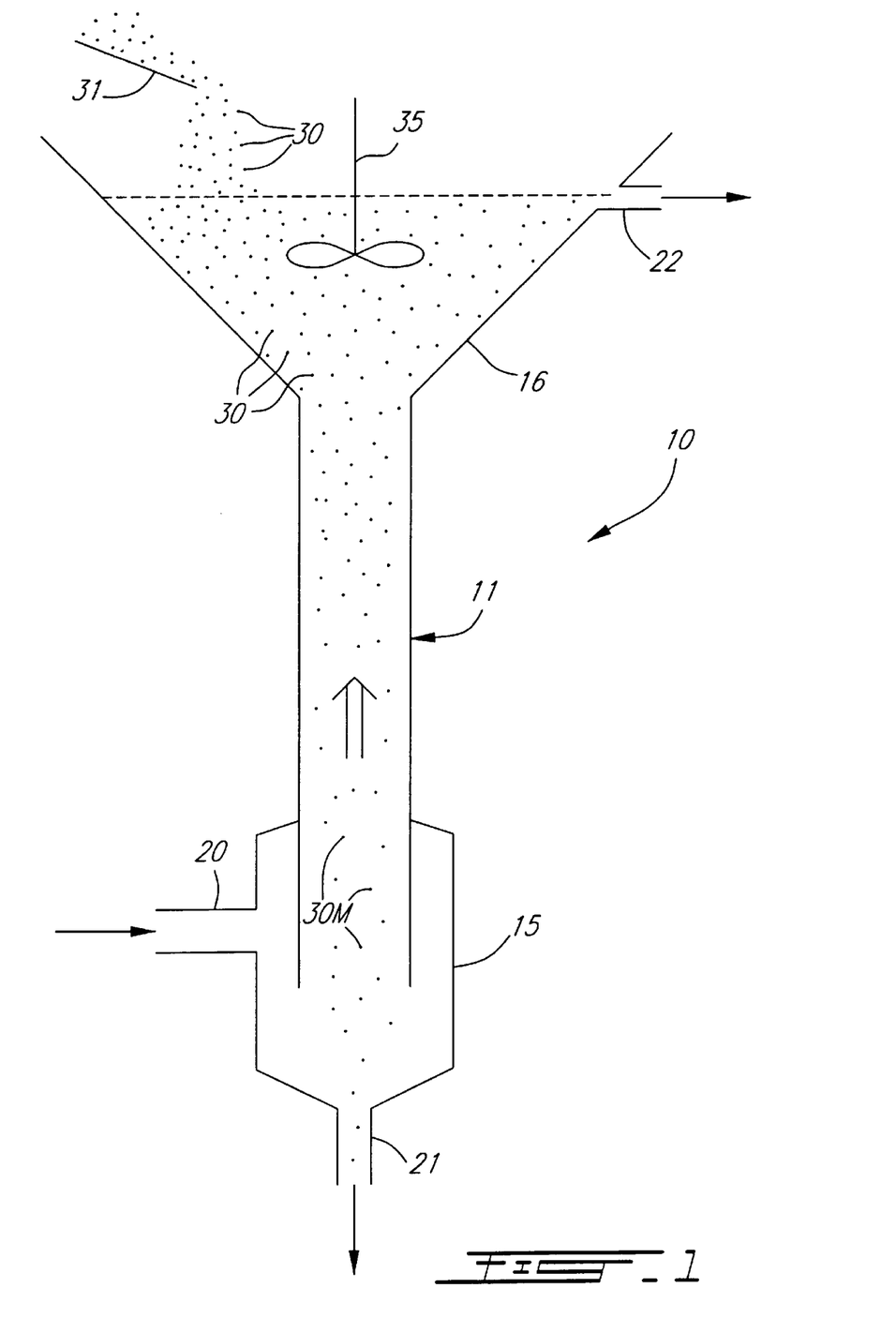
FIG. 1 describes a process diagram for the operation of a hydraulic mineral separator in accordance with an embodiment of the process of the present invention.

In the FIG. 1 hydraulic mineral separator 10 comprises an upright central tube 11 which extends from a water inlet chamber 15 to funnel opening 16. Water inlet 20 is attached to water inlet chamber 15, and discharge outlets 21 and 22 are attached to water inlet chamber 15 and funnel opening 16, respectively.

In the practise of the present invention, water is fed to separator 10 through water inlet 20. The water enters water inlet chamber 15 and then flows upward through central tube 11 into funnel opening 16. A portion of the water exits separator 10 through discharge opening 21, and the remaining water exits separator 10 through discharge opening 22. Discharge opening 21 is smaller than water inlet 20 so as to ensure that water is forced to flow upward through tube 11. The flow of water into separator 10 is controlled so that the flow of water upward through tube 11 is essentially constant.

In a first example, mercury-contaminated soil particles 30, having an essentially constant particle size by volume are added from hopper 31 to funnel opening 16. There, they are mixed into the water in funnel 16 by stirrer 35. While in funnel opening 16, soil particles 30 enter the upper opening of tube 11. Only those particles which contain mercury, or which consist essentially of mercury which has been released from soil particles 30 have a density which allows the particles to settle through the upwardly flowing water stream in tube 11. These dense soil particles (or mercury droplets), designated as 30M are able to settle through tube 11 and fall into water inlet chamber 15.

Water inlet chamber 15 has a cross sectional area greater than that of tube 11 so that the water velocity in chamber 15 is less than in tube 11. Accordingly, once particles 30M have reached chamber 15, they quickly settle to the bottom of chamber 15, and are removed through discharge opening 21. The mercury droplets or denser soil particles 30M can be separated from the water stream exiting discharge opening 21, and the water returned to the system through inlet 20.

Soil particles 30 which are not sufficiently dense to settle through tube 11 are eventually discharged from discharge opening 22. The particles may be separated from the water, and the water recycled to the system through inlet 20.

Stirrer 35 is optional particularly if funnel opening 16 is designed so as to promote mixing of soil particles 30 in the water from tube 11. This mixing minimizes the chances of mercury-contaminated soil prematurely exiting separator 10 through discharge opening 22.

In one embodiment of the present invention, a process as claimed in the present invention, and as described hereinabove, was utilized to remove mercury from a soil sample of 1500 tonne of a soil/clay mixture. This mixture was pre-screened to provide a coarse mixture having a soil particle size of less than 0.6 cm, and a medium mixture having a soil particle size of less than 0.3 cm.

The soil/clay mixtures were treated at a rate of about 5 tonne per hour, in a hydraulic mineral separator which was being fed with water at a rate of 15 gallons (68 liters) per minute (about 4 tonne per hour). Over 99.9% of the mercury analytically determined to be present in the soil/clay mixture, was recovered.

In a second example, particles of a caustic sludge sample (in this example caustic sludge particles are also referred to as item 30 in FIG. 1) were added from hopper 31 to funnel opening 16. There, the particles are mixed into the water in funnel 16 by stirrer 35. While in funnel opening 16, sludge particles 30 enter the upper opening of tube 11. Only those particles which contain mercury, or which consist essentially of mercury which has been released from caustic sludge particles 30 have a density/weight which allows these particles to settle through the upwardly flowing water stream in tube 11. These dense sludge particles (or mercury droplets), designated as 30M are able to settle through tube 11 and fall into water inlet chamber 15.

As described above, water inlet chamber 15 has a cross sectional area greater than that of tube 11 so that the water velocity in chamber 15 is less than in tube 11. Accordingly, once particles 30M have reached chamber 15, they quickly settle to the bottom of chamber 15, and are removed through discharge opening 21. The mercury droplets or denser sludge particles 30M can be separated from the water stream exiting discharge opening 21, and the water returned to the system through inlet 20.

Sludge particles 30 which are not sufficiently dense to settle through tube 11 are eventually discharged from discharge opening 22. The particles may be separated from the water, and the water recycled to the system through inlet 20.

Again, stirrer 35 is optional particularly if funnel opening 16 is designed so as to promote mixing of sludge particles 30 in the water from tube 11. This mixing minimizes the chances of mercury-contaminated sludge prematurely exiting separator 10 through discharge opening 22.

In an example of the embodiment of the present invention, a process as described hereinabove, was utilized to remove mercury from a caustic sludge sample which sample was analyzed to contain 55% mercury and 45% of carbon particles.

The sludge was passed through a hydraulic mineral separator as shown in FIG. 1. After one pass through the mineral separator, the "overflow" from the separator was analyzed to contain 16% mercury, and the sample collected from the bottom of the separator was essentially pure mercury.

The material collected from the separator "overflow" was again passed through the separator. Additional pure mercury was collected from the sample.

Figure 2:
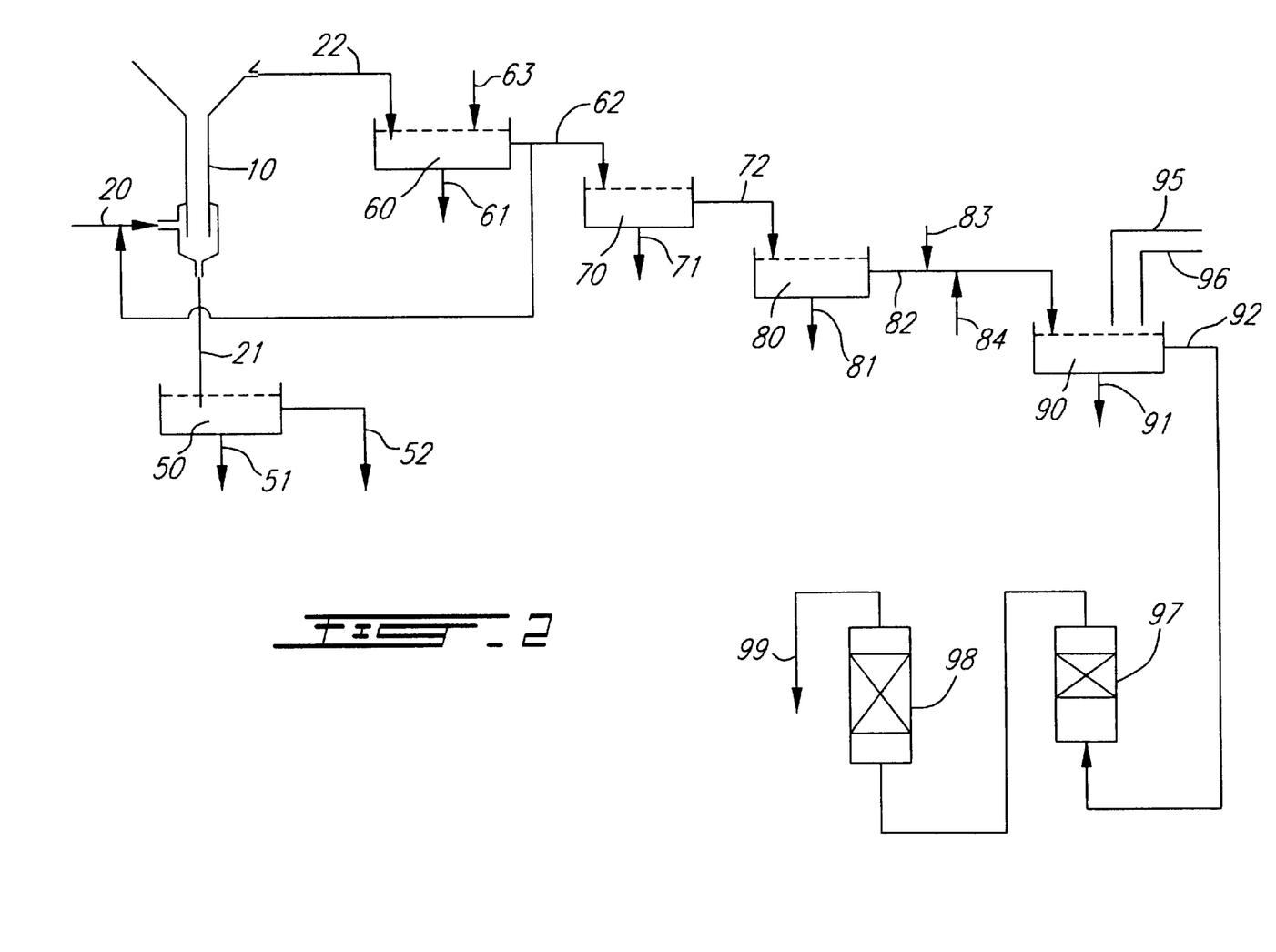
FIG. 2 describes a process flow sheet for the operation of a preferred process of the present invention.

In FIG. 2, a process flow sheet is shown wherein the water discharge from a hydraulic mineral separator 10 is shown. The water exiting mineral separator 10 through discharge outlet 21 is directed to sedimentation vessel 50. Settled "solids" consisting of the liquid mercury are removed through discharge outlet 51 while the water supernatant is removed through outlet 52.

The water exiting mineral separator 10 through discharge outlet 22 is directed, in series, to settle-mentation vessels 60, 70, and 80. At each vessel, settled solids are removed, respectively, from discharge outlets 61, 71 and 81. The supernatant from each vessel is removed respectively, through outlets 62, 72, and 82. In order to improve the sedimentation rate, aluminum sulphate is added as a coagulant through pipe 63. A portion of the supernatant removed from vessel 60 is recycled through pipe 64 to mineral separator water inlet 20 where it is mixed with water entering mineral separator 10.

The supernatant exiting vessel 80 is treated with sulphuric acid added through line 83 or caustic soda added through line 84 to a pH of between 7.5 and 8.5. The pH adjusted liquid is added to a settler 90. Ferrous sulphate and sodium hydrosulphide are added to settler 90 through inlet lines 95 and 96 respectively in order to create additional mercury-containing solid salts which settle to the bottom of settler 90. The settled solid salts are removed through outlet 91, and the supernatant is removed through outlet 92. The supernatant is then passed, in series through sand filter 97 and carbon filter 98. The water exiting carbon filter 98 is then discharged to the environment through outlet 99.

Figure 3:
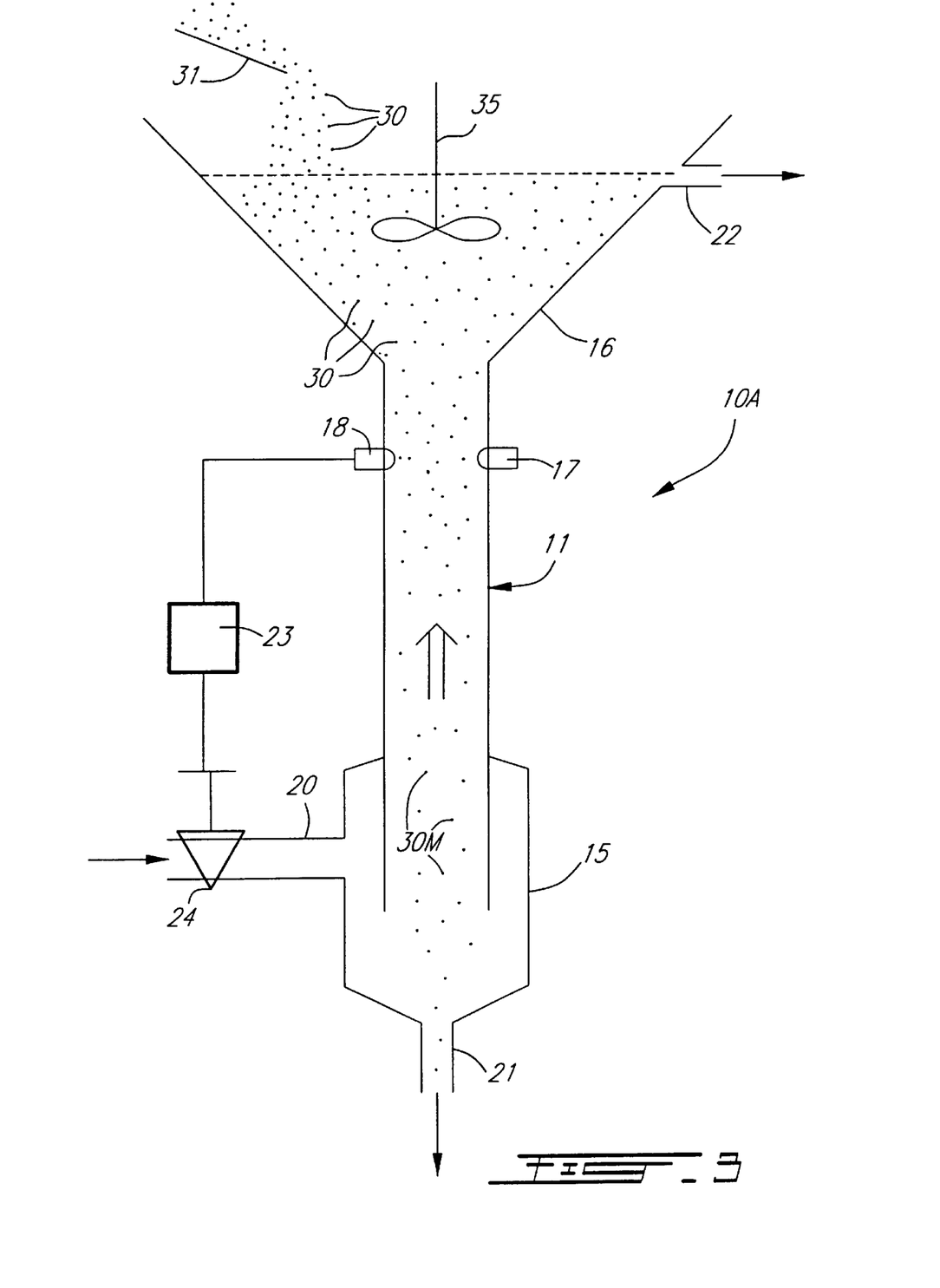
FIG. 3 is a hydraulic mineral separator in accordance with the present invention.

In FIG. 3 hydraulic mineral separator 10A is similar in construction to hydraulic mineral separator 10 shown in FIG. 1. However, hydraulic mineral separator 10A additionally comprises a light source 17 and a light sensor 18, both of which are connected to tube 11. Light sensor 18 is also operatively connected to water inlet valve 24 through a water valve controller 23.

In the operation of the apparatus shown in FIG. 3, water valve 24 is normally closed so as to prevent water from entering inlet water chamber 15. As particles 30 and 30M settle through tube 11, they pass in front of light source 17 and break the light signal to light sensor 18. In this manner, light sensor 18 is able to detect the presence of particles 30 and 30M in the sample tube. The presence of particles is relayed to controller 23 which opens water inlet valve 24 for 4 seconds (or any other set period of time). Valve 24 is set so as to allow a sufficient flow of water into tube 11 so as to cause particles 30 to flow upwards back into funnel 16. However, the flow rate is not sufficient to significantly raise particles 30M which settle through tube 11. After the set period of time, controller 23 closes valve 24 so as to stop the flow of water into tube 11. This allows additional particles 30 and 30M to enter tube 11 where again, they are detected by light sensor 18.

In a modification of the shown apparatus, water valve 24 can be set so as to provide a low water flow rate (a base rate) which flow rate is low enough to allow particles 30 and 30M to pass in front of light sensor 18 so as to be detected. When detected, controller 23 causes water inlet valve 24 to open further so as to allow additional water into water inlet chamber 15 and thus increase the water flow rate through tube 11. The increased flow rate is in accordance with the flow rate described hereinabove with respect to FIG. 3. After a set period of time, controller 23 causes valve 24 to close once again to the point where it provides the base flow rate.

This second approach can also be accomplished by providing a second water inlet (not shown) which allows water to flow into the bottom of tube 11 at the base flow rate.

Figure 4:
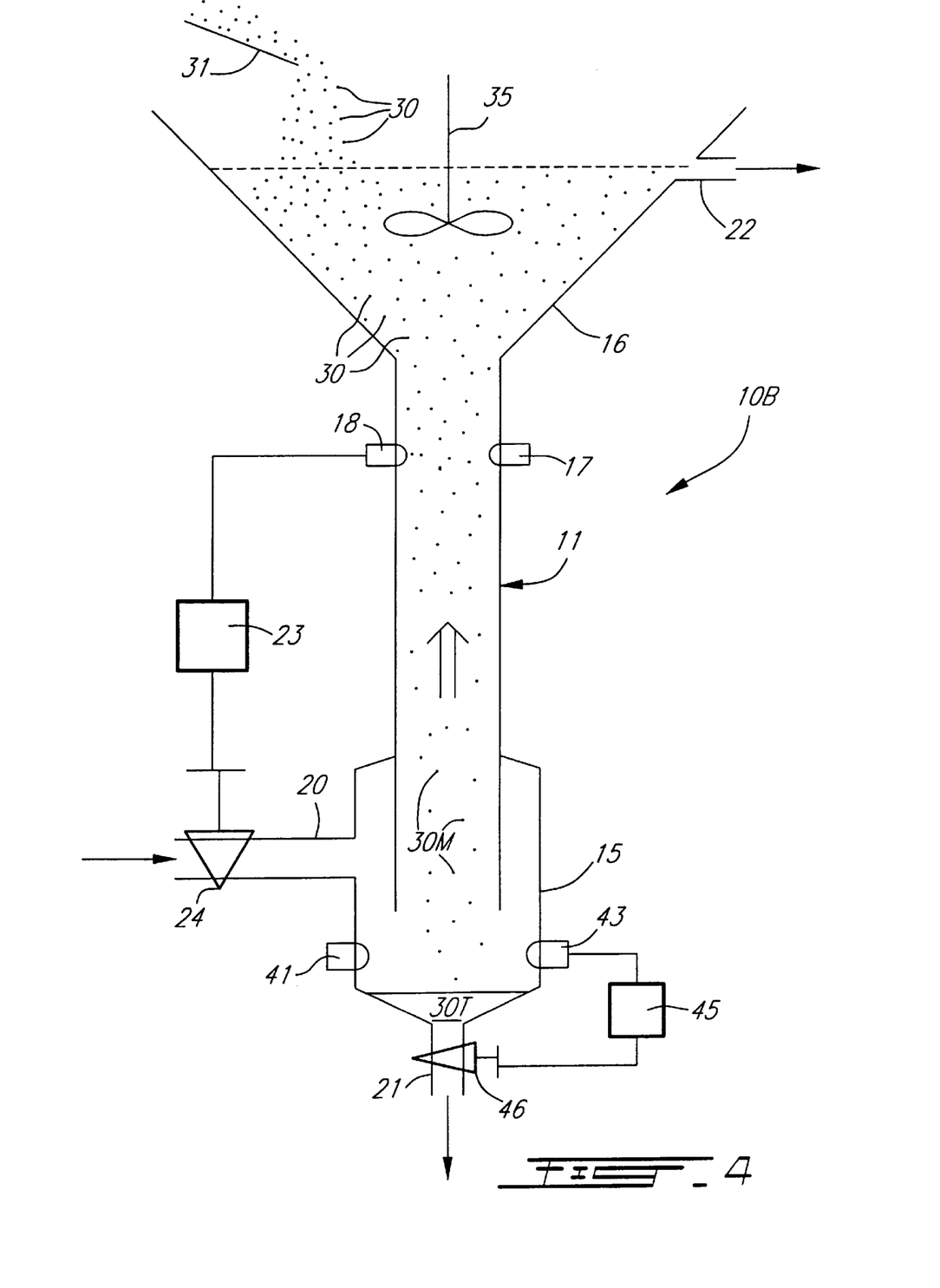
FIG. 4 is a modified hydraulic mineral separator wherein an outlet valve is added.

In FIG. 4, a further modification of the separator (herein designated as 10B) of the present invention is shown which additionally comprises an additional light source 41, an additional light sensor 43, an additional controller 45, and an outlet valve 46. In this apparatus, outlet valve 46 is normally closed so that particles 30M collect at the bottom of water inlet chamber 15. If particles 30M are essentially insoluble in water (such as, for example, mercury droplets), the particles collect into a near homogeneous, water free mass 30T at the bottom of chamber 15. When sufficient particles have collected, mass 30T continuously interferes with the transmission of light from light source 41 to light sensor 43. This continuous interruption of the light beam causes controller 45 to open valve 46 for a set period of time. Mass 30T is allowed to drain through outlet 21 when valve 46 is open. Valve 46 is preferably open for a period of time sufficient to remove a substantial portion of mass 30T through outlet 21.

The flow rate of mass 30T through outlet 21 can also be adjusted so as to have a minimal effect on the flow rate of water through tube 11.

Other means can be utilized so as to cause mass 30T to drain from the apparatus. These means can include a high and low mass 30T level detectors which opens valve 46 when the high level is reached, and closes valve 46 when a low level is reached.

Figure 5:
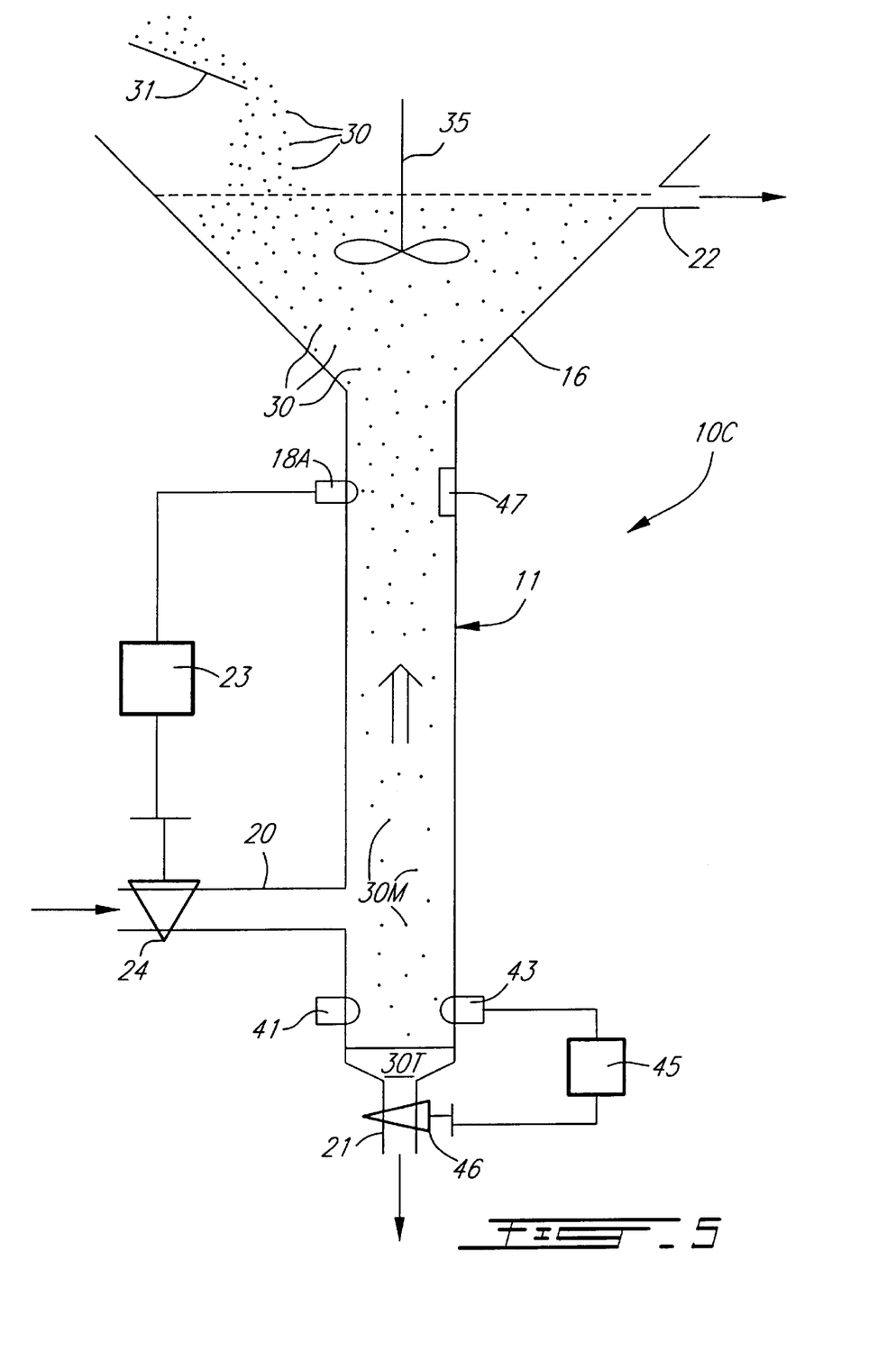
FIG. 5 is an alternative embodiment of the apparatus of the present invention.

In FIG. 5, a further modification of the apparatus of the present invention is shown wherein water inlet chamber 15 of separator 10C has been eliminated. In this embodiment, water inlet 20 is directly connected to tube 11 so that water directly enters the tube. Further, outlet 21 is located at the bottom of tube 11. Mass 30T is allowed to collect at the bottom of tube 11. Particle sensor 18 has been replaced by a combined light source/light sensor 18A, and light source 17 has been replaced by a mirror 47 which acts as a reflective surface. Light from the source/sensor 18A is reflected off of mirror 47 back to source/sensor 18A. Any particles breaking the light beam between the source and sensor as the light travels to and from mirror 47, will be detected by the sensor 18A.

In order to minimize disruption of mass 30T, water inlet 20 is preferably located above light sensor 43 so that mass 30T is below the water inlet location.

Having described specific embodiments of the present invention, it will be understood that modifications thereof may be suggested to those skilled in the art, and it is intended to cover all such modifications as fall within the scope of the appended claims.

The embodiments of the invention in which an exclusive property or privilege is claimed are defined as follows:

1. A hydraulic mineral separator comprising:
  a substantially vertical tube having a liquid inlet at or near the bottom of said tube;
  a liquid outlet at or near the top of said tube so that liquid flows upwardly through said tube from said liquid inlet to said liquid outlet;
  a particle sensor located within said vertical tube; and,
  a liquid flow regulator, operatively connected to said particle sensor, which regulator adjusts the flow rate of liquid within said vertical tube when a particle, or particles, is or are detected by said particle sensor.

2. A hydraulic mineral separator as claimed in claim 1 wherein said liquid is water.

3. A hydraulic mineral separator as claimed in claim 1 wherein said particle sensor is located in the upper half of the vertical tube.

4. A hydraulic mineral separator as claimed in claim 1 wherein said liquid flow regulator is a valve which will open or close in accordance with desired parameters based on signals received from the particle sensor.

5. A hydraulic mineral separator as claimed in claim 1 having a pre-established heavy particle collection rate, wherein said flow rate through said vertical tube is increased or decreased as necessary in order to achieve said collection rate.

6. A hydraulic mineral separator as claimed in claim 1 which additionally comprises a high density particle level sensor at the bottom of, or below the bottom end of the vertical tube, and an outlet valve operatively connected to said high density particle level sensor, wherein said outlet valve is opened or closed in accordance with signals received from said high density particle level sensor.

7. A process for the separation of higher density materials from lower density materials in a material sample comprising treating said sample in a hydraulic mineral separator as claimed in claim 1.

8. A hydraulic mineral separator as claimed in claim 1 wherein said separator is utilized to separate a solid from a sample liquid.

9. A hydraulic mineral separator as claimed in claim 8 wherein said sample liquid is mercury.

10. A hydraulic mineral separator as claimed in claim 1 wherein said particle sensor acts based on a physical property difference between said particle and said liquid.

11. A hydraulic mineral separator as claimed in claim 10 wherein said physical property is conductivity, capacitance, magnetism, or transparency to electromagnetic radiation.

12. A hydraulic mineral separator as claimed in claim 11 wherein said particle sensor is a light sensor.

13. A hydraulic mineral separator as claimed in claim 12 wherein said light sensor operates in the visible spectrum.

14. A hydraulic mineral separator as claimed in claim 1 wherein said liquid flow regulator operates by increasing or decreasing the flow rate of liquid to the separator.

15. A hydraulic mineral separator as claimed in claim 14 wherein said liquid flow regulator operates by adjusting the liquid flow rate while maintaining a constant, positive base flow rate.

16. A hydraulic mineral separator as claimed in claim 1 additionally comprising:
  (i) water inlets near the surface of the particle sensor(s) in order to maintain a clean surface near the face of each sensor;
  (ii) a water inlet valve near the top end of the vertical tube in order to ensure that the top end of the vertical tube is not blocked by a large inflow of particles added to the mixer;
  (iii) a stirring motor in the particle mixer in order to keep particles in the mixer in a free-flowing, non-agglomerated state;
  (iv) a controller connected to the stirring motor which controller adjusts the rate of particle addition to the mixer based on changes in the power requirement of the mixer, thus ensuring that the number of particles in the mixer is essentially constant; or
  (v) a mixing device within the vertical tube area.

17. A hydraulic mineral separator as claimed in claim 16 wherein said mixing device within the vertical tube area is an ultrasonic mixer.

18. A hydraulic mineral separator as claimed in claim 1 wherein said particle sensor and the liquid flow regulator are connected through an electronic, programable controller which has been programmed to operate the liquid flow regulator in a pre-determined fashion once a particle has been detected by the particle sensor.

19. A hydraulic mineral separator as claimed in claim 18 wherein said particle sensor is located in the upper half of the vertical tube.

20. A hydraulic mineral separator as claimed in claim 18 having a base flow rate of liquid through said vertical tube, and an increased flow rate, and wherein said flow rate is adjusted from said base flow rate to said increased flow rate for a set period of time when said particle sensor detects a particle.

21. A hydraulic mineral separator as claimed in claim 20 wherein said set period of time is from 0.1 to 10 seconds.

22. A hydraulic mineral separator as claimed in claim 20 wherein said set period of time is from 1 to 3 seconds.

* * * * *